A. L. HOSMAN.
COMBINED HOEING AND COTTON CHOPPING MACHINE.
APPLICATION FILED SEPT. 28, 1917.

1,299,346.

Patented Apr. 1, 1919.
3 SHEETS—SHEET 1.

A. L. Hosman
Inventor

By Geo. P. Kimmel
Attorney

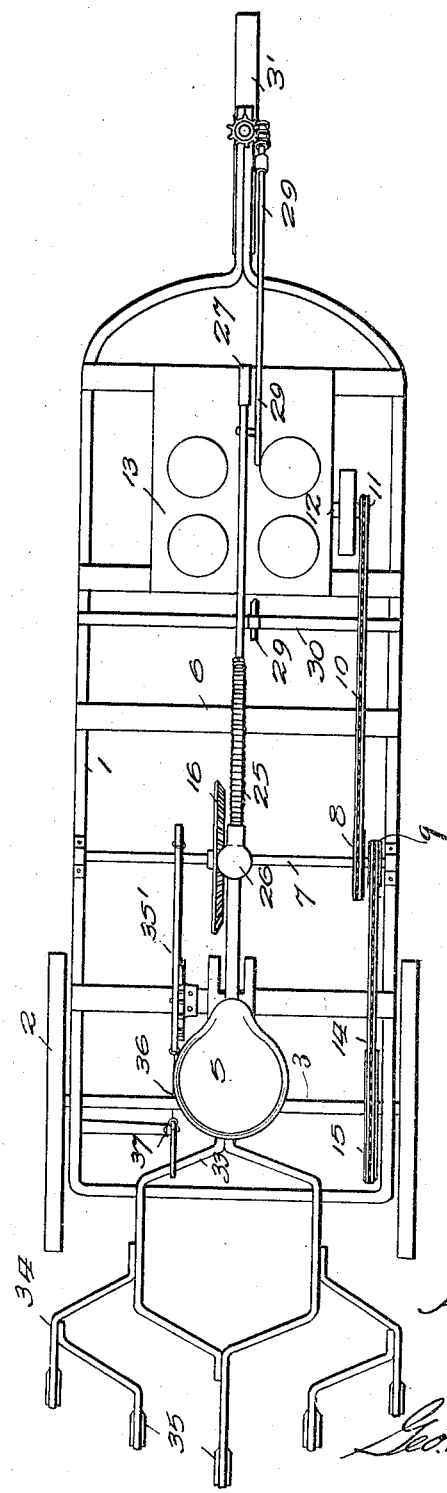

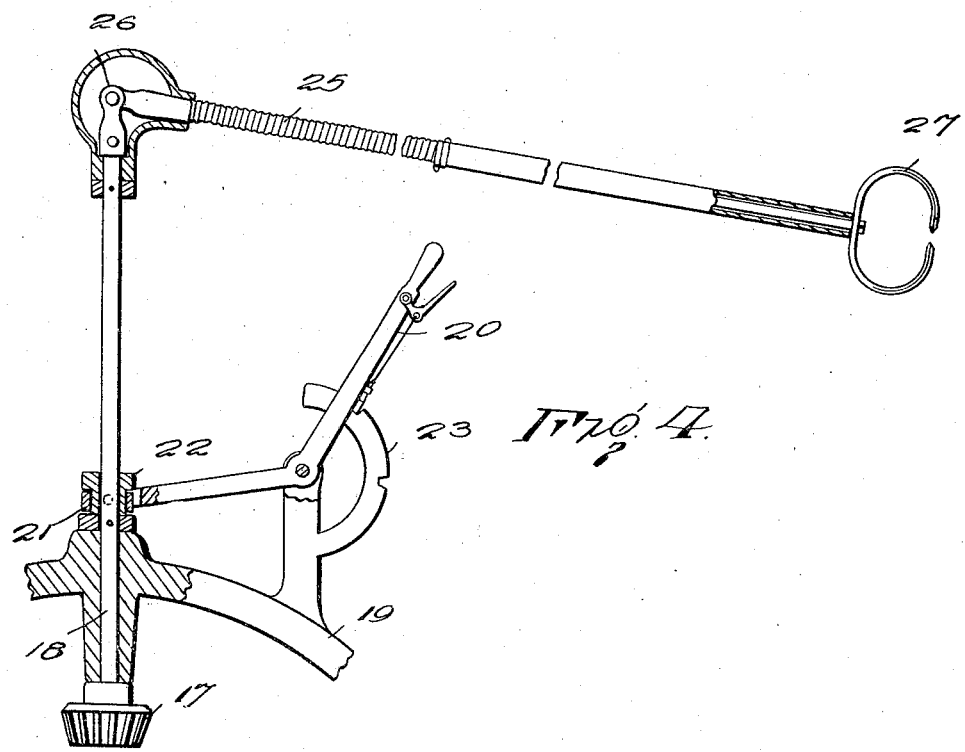

UNITED STATES PATENT OFFICE.

ARLEY L. HOSMAN, OF CARTERVILLE, MISSOURI.

COMBINED HOEING AND COTTON-CHOPPING MACHINE.

1,299,346.      Specification of Letters Patent.      Patented Apr. 1, 1919.

Application filed September 28, 1917. Serial No. 193,730.

*To all whom it may concern:*

Be it known that I, ARLEY L. HOSMAN, a citizen of the United States, residing at Carterville, in the county of Jasper and State of Missouri, have invented certain new and useful Improvements in Combined Hoeing and Cotton-Chopping Machines, of which the following is a specification.

The present invention has reference to cultivating machines and relates, more particularly to a combined hoeing and cotton chopping machine.

The invention has for its principal object to provide a cotton chopping and hoeing machine having portable means for cultivating the soil about cotton plants, corn, etc., and being arranged so as to permit said means to be readily moved into engagement with any matter to be chopped, cut or hoed.

Another and equally important object of the invention is to provide a novel drive for the chopping and hoeing means, whereby the latter can be moved angularly with relation to the drive in order that it may be moved into engagement with the desired matter and also, can be stopped as it becomes necessary.

The invention consists, furthermore, in the novel arrangement and combination of parts of the machine, as well as in the details of the construction of the same, all of which will be more fully described in the following specification, and then finally embodied in the clauses of the claims, which are appended to the specification and which form an essential part of the same.

The invention is clearly illustrated in the accompanying drawings, in which:—

Fig. 2 is a top plan thereof;

Fig. 3 is a detailed end perspective of the cultivating implement; and

Fig. 4 is a detail in section through the power transmitting means of the cultivating implement.

Similar characters of reference refer to similar parts throughout the several views of the drawings.

Figure 1:
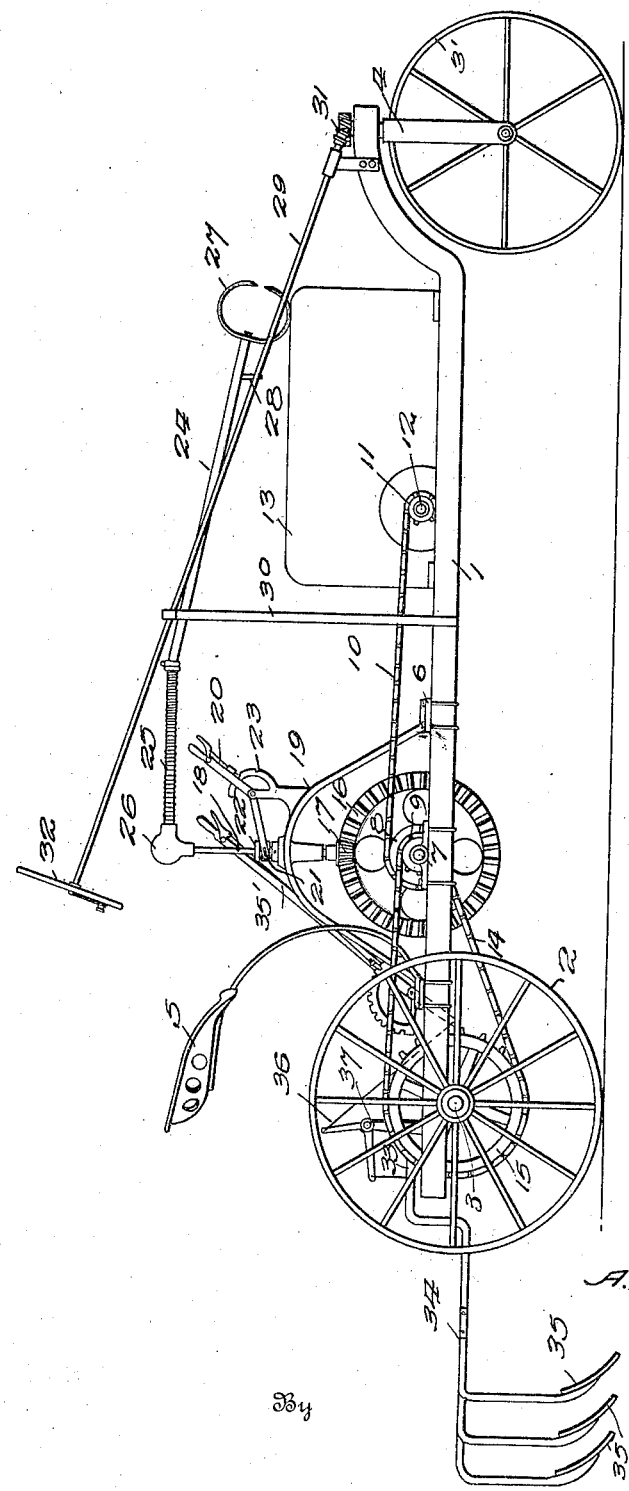
Figure 1 is a side elevation of the improved machine.

Having more particular reference to the drawings, 1 represents the frame of the machine having rear wheels 2 mounted upon a drive axle 3 and a steering wheel 3' arranged in bearings in a forked member 4, which member is rotatably engaged with the said forward end of the frame 1. A seat 5 is carried upon a spring standard secured at its lower extremities to a cross bar extending transversely of the frame 1, it being noted in this connection, that a similar cross bar, designated by the numeral 6 is arranged in spaced relation thereto and serves for a purpose which will be subsequently obvious.

Mounted in bearings arranged upon the opposite sides of the frame 1 is a transversely disposed driven shaft 7, the same having sprocket wheels 8 and 9 keyed thereupon, the sprocket wheel 8 receiving one end of a sprocket chain 10 thereabout, the remaining end of which is extended forwardly of the frame 1 and about a sprocket wheel 11 arranged upon the power transmitting shaft 12 of an engine 13 or other form of prime mover. Connection between the driving axle 3 and the driven shaft 7 is effected by way of a sprocket chain 14, one end of which is engaged with the sprocket wheel 9 while the remaining end thereof is engaged with a sprocket wheel 15 keyed upon the said driving axle 3.

Fixedly mounted upon the intermediate portion of the driven shaft 7 is a beveled gear 16, which gear meshes with a pinion 17 carried upon the lower extremity of a shaft 18, which shaft is slidably mounted in bearings formed in a supporting stand 19, the opposite legs of which are secured to the several transversely disposed bars, one of which is designated by the numeral 6 and the other of which supports the seat post. As means for imparting sliding movement to the shaft 18 a lever 20 is provided carrying upon one end thereof a collar 21 receivable about the intermediate portion of the shaft 18 and adapted to be engaged with stop collars 22 fixedly mounted on the said shaft. A segment 23 having notches formed in the periphery thereof is secured to an arm formed on the stand 19 and is adapted to be engaged by the slidable pawl carried on the lever 20, in order that the said lever may be locked in adjusted position. By this means, the shaft 18 can be raised or lowered, to move the pinion 17 into and out of mesh with respect to the gear 16.

The combined chopping and hoeing implement includes a shaft 24 connected at one end by way of a flexible shaft 25 to a universal joint 26, which joint is also connected to the upper end of the shaft 18. That is, the shafts 18 and 25 are connected by a universal joint 26, having the usual form of flexible covering or casing as shown. Upon the free end of the shaft 24 the combined chopping and hoeing implement is mounted and is formed of a single or a plurality or strips of metal having the opposite edges thereof sharpened to provide blades, which blades are curved upon themselves for an obvious purpose. The combined chopping and hoeing implement *per se* is designated for the purpose of convenience by the numeral 27. To support the shaft 24 of the implement 27 while the same is in idle or inoperative position, I provide a bifurcated bracket 28, which bracket is arranged upon the steering column 29 hereinafter more fully described. It will be readily understood, that the connection of the implement 27 with the shaft 18 is such as to permit angular movement of the same with relation thereto.

The steering column 29 is supported upon a suitable bearing bracket 30 and is connected through the medium of gearing indicated by the numeral 31 to the forked bearing member 4. To facilitate rotation of the column a steering wheel 32 is fixedly mounted upon the upper end of the said column and carries the usual control means whereby the speed of the engine 13 may be varied at will by the operator.

Pivotally secured to the rear cross bar arranged on the frame 1 is a draft connection indicated in its entirety by the numeral 33, the rear end of which is forked and connected to the beams 34 of plows 35. A lever 35' is mounted upon the rear portion of the frame, and has connection with the draft connection 33 by way of a connecting rod 36 and link 37.

In operation, the machine is driven over a field or other surface; the shaft 24 being held in one hand of the operator and moved so as to cause the engagement of the implement 27 with plants to be chopped or earth to be cultivated. Due to the connection between the shaft 24 and the shaft 18, the operator may readily move the cutting implement 27 into any position to allow proper functioning thereof. When in its idle position, the shaft 24 is supported upon the bifurcated bracket 28. By operating the lever 20 the shaft 18 may be moved vertically to cause disengagement of the pinion 17 from the beveled gear 16, thus, interrupting the transmission of rotary motion to the implement 27. The plow 35 may be disengaged from the soil by rocking the lever 35' in the proper direction. Further, it will be also appreciated that the plows may be arranged at varying depths in the soil by proper adjustment of the lever 35'.

It is to be understood, that the combined chopping and hoeing implement does not necessarily receive its drive in the manner as shown, but may be arranged upon a horse drawn vehicle having suitable power transmission gearing interconnected with the wheels thereof for transmitting rotary motion to the shaft 24 of the said implement.

Manifestly, the construction shown is capable of considerable modification and such modification as is within the scope of my claims, I consider within the spirit of my invention.

I claim:—

1. In a machine of the character described, a wheeled frame, a driven shaft intergeared with certain of the wheels of said frame, a bevel gear fixed thereto, a second driven shaft carrying a pinion meshing with the bevel gear, said second driven shaft being slidably mounted, means for imparting sliding movement to the second driven shaft, a portable shaft, a flexible shaft jointed to said portable shaft, a universal joint for connecting the second driven shaft to said flexible shaft, and a cutting implement carried upon the free end of the portable shaft.

2. In combination with the power transmission of a wheel vehicle; a horizontally positioned shaft journaled in the frame of the vehicle, a gear fixed thereon and vertically positioned, a frame straddling said gear, a vertical shaft slidable in the frame having a pinion at its lower end adapted to mesh with said gear, means for raising and lowering the vertical shaft to move the pinion into and out of mesh with respect to the gear, a flexible shaft having universal connection with the vertical shaft, and a rotating cutting implement carried upon the free end of said flexible shaft.

3. In combination with the power transmission of a wheel vehicle; a horizontally positioned shaft journaled in the frame of the vehicle, a gear fixed thereon, a flexible shaft having geared connections with said gear, means for supporting said flexible shaft when inoperative, and a rotatable cutting implement at the free end of said flexible shaft, said implement being in form of a T-shaped member with opposed cutting edges.

4. In a combined hoeing and cotton chopping machine, a wheeled frame, a shaft journaled transversely of the frame, means for driving said shaft, a gear fixed to said shaft mounted on the frame, a supporting frame spanning said gear and shaft thereof, a vertical shaft journaled therein, lever operated means associated with said vercal shaft for raising and lowering the same, a pinion at the lower end of the shaft adapted to be brought into mesh with the gear and moved out of mesh with respect thereto upon the vertical shaft being elevated, a flexible shaft, a universal coupling between the flexible shaft and the vertical shaft, a hoeing and cutting implement at the free end of said flexible shaft, and steering means for the wheeled frame.

In testimony whereof I affix my signature hereto.

ARLEY L. HOSMAN.

Copies of this patent may be obtained for five cents each, by addressing the "Commissioner of Patents, Washington, D. C."